(12) United States Patent
Cameron et al.

(10) Patent No.: US 7,822,988 B2
(45) Date of Patent: Oct. 26, 2010

(54) METHOD AND SYSTEM FOR IDENTITY RECOGNITION

(75) Inventors: Kim Cameron, Bellevue, WA (US);
Arun Nanda, Sammamish, WA (US);
Don Hacherl, North Bend, WA (US);
Murli Satagopan, Sammamish, WA (US); Stuart Kwan, Redmond, WA (US); Colin Brace, Seattle, WA (US);
Walter Smith, Seattle, WA (US);
Melissa Dunn, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1183 days.

(21) Appl. No.: 10/693,172

(22) Filed: Oct. 23, 2003

(65) Prior Publication Data

US 2005/0091495 A1 Apr. 28, 2005

(51) Int. Cl.
*H04L 9/32* (2006.01)
(52) U.S. Cl. .................. 713/180; 713/175; 713/177
(58) Field of Classification Search .............. 713/175, 713/168, 177–180
See application file for complete search history.

(56) References Cited

U.S. PATENT DOCUMENTS

| 5,872,847 | A  | * | 2/1999  | Boyle et al. ................ 713/151 |
| 6,216,229 | B1 | * | 4/2001  | Fischer ........................ 713/182 |
| 6,266,420 | B1 |   | 7/2001  | Langford et al. ............ 380/282 |
| 6,434,399 | B1 | * | 8/2002  | Kamperschroer ........... 455/524 |
| 6,801,998 | B1 | * | 10/2004 | Hanna et al. ................ 713/155 |
| 7,068,789 | B2 |   | 6/2006  | Huitema et al. ............. 380/277 |

(Continued)

FOREIGN PATENT DOCUMENTS

WO   WO 02/073341 A3   9/2002

(Continued)

OTHER PUBLICATIONS

Login-Less Simplified Transaction Process. IBM Tech, dis. bull., Feb. 2002, Issue 454, p. 362.*

(Continued)

*Primary Examiner*—Kimyen Vu
*Assistant Examiner*—Randal D Moran
(74) *Attorney, Agent, or Firm*—Merchant & Gould PC

(57) ABSTRACT

In accordance with various aspects, the present invention relates to methods and systems for sending an identity information document comprising selecting identity information from a self-identity information store for inclusion in the identity information document. The selected identity information is read from a self-identity information store. The identity information document is generated to include the selected identity information and one or more keys, and signed using a key associated with one of the keys included in the identity information document. The identity information document is then sent to a recipient. Receiving an identity information document comprises receiving a signed identity information document from an originator. A determination is made as to whether identity information in the identity information document is reliable. The identity information is saved in a recognized identity information store if the identity information is determined to be reliable. If the identity information is determined to be unreliable, an identity recognition number retrieved from the sender is compared to an identity recognition number generated by the recipient based on information in the received identity information document. If the identity recognition number is verified, the identity information is saved in the recognized identity information store.

24 Claims, 6 Drawing Sheets

U.S. PATENT DOCUMENTS

| | | | |
|---|---|---|---|
| 2002/0016777 A1* | 2/2002 | Seamons et al. | 705/76 |
| 2002/0044650 A1* | 4/2002 | Shen | 380/30 |
| 2003/0056093 A1 | 3/2003 | Huitema et al. | 713/156 |
| 2003/0115342 A1* | 6/2003 | Lortz | 709/229 |
| 2004/0010696 A1* | 1/2004 | Cannon et al. | 713/186 |
| 2004/0204087 A1* | 10/2004 | Carlsson | 455/558 |

FOREIGN PATENT DOCUMENTS

WO    WO 03/038557 A2    5/2003

OTHER PUBLICATIONS

Login-Less Simplified Transaction Process. IBM Tech, dis. bull., Feb. 2002, Issue 454, p. 362.*

Login-Less Simplified Transaction Process. IBM Tech, dis. bull., Feb. 2002, Issue 454, p. 362.*

"Self-certified signatures," by Byoungcheon Lee; Kwangjo Kim, Process in Cryptology—INDOCRYPT 2002. Third International Conference on Cryptology in India. Proceedings (Lecture Notes in Computer Sci. Col. 2551), p. 119-214.

"Attribute authority functions that enable certifying personal attributes," by Murat, Yuichi; Odahara, Hideyuki, NTT Review v 14 n 6 Nov. 2002, p. 59-62.

"Digital signature/multisignature schemes giving public key verification and message recovery simultaneously," by Tzong-Chen Wu, Computer Systems Science and Engineering, vol. 16, No. 6, p. 329-37.

"Self-certified identity information using the minimum knowledge," by H.

Login-less Simplified Transaction Process. IBM Technical Disclosure Bulletin, Feb. 2002, Issue 454, p. 362.

Hoang, Daniel L., U.S. Appl. No. 10/692,530. Office Communication dated Mar. 16, 2007.

"Self-certified identity information using the minimum knowledge," by Hyung-Kyu Yang; John-Ho Choi; Youhng-Hwa Ann, 1996 IEEE TENCON Digital Signal Processing Applications Proceedings (Cat No. 96CH36007), Part vol. 2, p. 641-7.

"Microsoft to Acquire Groove Networks," http://www.groove.net/home/index.cfm.

"Microsoft Office Groove," http://en.wikipedia.org/wiki/Microsoft_Office_Groove, printed Jun. 28, 2007, pp. 1-2.

"vCard," http://en.wikipedia.org/wiki/VCard, printed Jun. 28, 2007, pp. 1-3.

"X.509," http://en.wikipedia.org/wiki/X.509, printed Jun. 28, 2007, pp. 1-6.

Callas et al., "OpenPGP Message Format," NWG Apr. 2007, pp. 1-80.

"Pretty Good Privacy," http://en.wikipedia.org/wiki/Pretty_Good_Privacy, printed Jun. 28, 2007, pp. 1-8.

Garfinkel, Simson L., "Pgp: pretty good privacy" Google Book Search, printed Jun. 28, 2007, pp. 1-4.

Dawson et al., "vCard MIME Directory Profile," NWG RFC 2426, Sep. 1998 http://tools.ietf.org/html/rfc2426, pp. 1-42.

Udell, Jon, "Groove supports diverse group formation in a fluid and highly secure way," InfoWorld, printed Jun. 27, 2007, pp. 1-2.

"Security Services," Goove Brief, 2002 Groove Networks, Inc., pp. 1-4.

"Groove Security Bulletin," Groove Brief, 2002 Groove Networks, Inc., pp. 1-6.

"vCard," Version 2.1, A versit Consortium Specification, Sep. 18, 1996 http://www.imc.org/pdi/vcard-21.txt, printed Jun. 27, 2007, pp. 1-26.

Housley et al., "Internet X.509 Public Key Infrastructure Certificate and Certificate Revocation List (CRL) Profile," RFC 3280, NWG Apr. 2002, http://tools.ietf.org/html/rfc3280, printed Jun. 27, 2007, pp. 1-127.

"Commerce-An Introduction," by A. Meyer; P. Taylor; Computing & Control Engineering Journal, vol. 11, No. 3, p. 107-8; IEE; Jun. 2000, UK.

"Attribute Authority Functions That Enable Certifying Personal Attributes," by Y. Murata; H. Odahara; NTT Review, v. 14 n.6, Nov. 2002; p. 59-62.

"Threshold Signature Scheme Using Self-Certified Public Keys," by Tzong-Sun Wu; Chien-Lung Hsu; Journal of Systems and Software, vol. 67, No. 2; p. 89-97.

"A Study of the Key Distribution in Secure Multicast," by Zhu Wen-Tao; Xiong Ji-Ping; Li Jin-Sheng; Hone Pei-Lin; Journal of Software, vol. 14, No. 12; p. 2052-9.

"Security Analysis of the Improved Group Signature," by Z. Jiamhong; C. Ziaofeng; W. Yumin; Proceedings 2003 IEEE Information Theory Workshop (Cat. No. 03EX674), p. 171-4.

"Co-operatively Formed Group Signatures," by G. Maitland; C. Boyd; Topics in Cryptology—CT-RSA 2002. Cryptographers' Track at the RSA Conference 2002. Proceedings (Lecture Notes in Computer Science vol. 2271), p. 218-35.

"A Look at Some More PKI Design Efforts," by A. Mione; Digital Systems Report, 1998, vol. 20, No. 4; pp. 15-21.

"Authenticated Secure Communications in Mobile Ad Hoc Networks," by M. Bohio; A. Miri; Proceedings of the 2004 IEEE Canadian Conference on Electrical and Computer Engineering, Niagara Falls, Canada, May 2004, vol. 3; p. 1689-1692.

"An Identity-Based Signature From Gap Diffie-Hellman Groups," by J.C. Cha; J.H. Cheon; $6^{th}$ Int'l Workshop on Practice and Theory in Public Key Cryptology—PKC'2003, Lecture Notes on Computer Science 2567, Springer-Verlag 2003, p. 18-30.

"On the Security of Homage Group Authentication Protocol," by E. Jaulmes; G. Poupard; IEE, published 2002; Proceedings Financial Cryptology 2000, Lecture Notes in Computer Science; p. 106-116.

"Delegation Chains Secure Up to Constant Length," by M. Abe; T. Okamoto; Int'l Conference on Information and Communications Security; $2^{nd}$ Int'l Conference, ICICS'99, Sydney, Australia, 1999, p. 144-156.

"An Improvement of Nonrepudiable Threshold Proxy Signature Scheme with Known Signers," by S.F. Tzeng; M.S. Hwang; C.Y. Yang; Computers & Security, vol. 23, pp. 174-178, 2004.

"Authorization Models—PKI Versus the Real World," by S. Matthews; Information Security Technical Report, vol. 5, No. 4 (2000), pp. 66-71.

"Integrated Security Services for Dynamic Coalitions," by H. Khurana; S.Gavrila; R. Bobba; R. Koleva; A. Sonalker; E. Dinu; V. Gligor; J. Baras; Proceedings of the $3^{rd}$ DARPA Information Survivability Conference and Exposition, Washington, D.C., Apr. 2003, p. 38-40.

Office Action dated Sep. 6, 2007 in U.S. Appl. No. 10/692,530.

Non-final Office Action dated Apr. 2, 2008 in U.S. Appl. No. 10/692,530, filed Oct. 24, 2003.

Final Office Action dated Sep. 30, 2008 in U.S. Appl. No. 10/692,530, filed Oct. 24, 2003.

Non-Final Office Action dated Mar. 16, 2007 in U.S. Appl. No. 10/692,530.

Non-Final Office Action dated Dec. 23, 2008 in U.S. Appl. No. 10/692,530.

International Search Report and Written Opinion of the International Searching Authority for PCT/US04/24370, dated Feb. 21, 2007.

Non-Final Office Action dated Dec. 23, 2009 in U.S. Appl. No. 10/692,530.

Final Office Action dated Jul. 14, 2009 in U.S. Appl. No. 10/692,530.

European Communication dated Aug. 22, 2007 in EP Application No. 04779433.4.

China Intellectual Property Office of the People's Republic of China, First Office Action, mailed Aug. 21, 2009 in Application Serial No. 200480001392.8 (translated), 18 pp.

Intellectual Property Corporation of Malaysia, Communication mailed Dec. 24, 2007 in Application Serial No. PI20042875, 3 pp.

Republic of the Philippines Dept. of Trade & Industry Intellectual Property Office, Communication mailed Aug. 28, 2007 in Application Serial No. 1-2005-500434, 1 p.

Response to Final Office Action mailed Dec. 1, 2008 in U.S. Appl. No. 10/692,530, 16 pp.

Response to Final Office Action mailed Dec. 6, 2007 in U.S. Appl. No. 10/692,530, 14 pp.

Response to Final Office Action mailed Nov. 16, 2009 in U.S. Appl. No. 10/692,530, 15 pp.

Response to Intellectual Property Corporation of Malaysia, Communication mailed Aug. 19, 2008 in Application Serial No. PI20042875, 11 pp.

Response to Non-Final Office Action mailed Jul. 2, 2008 in U.S. Appl. No. 10/692,530, 18 pp.

Response to Non-Final Office Action mailed Jun. 15, 2007 in U.S. Appl. No. 10/692,530, 14 pp.

Response to Non-Final Office Action mailed Mar. 23, 2009 in U.S. Appl. No. 10/692,530, 15 pp.

Response to Non-Final Office Action mailed May 24, 2010 in U.S. Appl. No. 10/692,530, 19 pp.

Response to Patent Office of IP Australia, First Official Report mailed Feb. 2, 2010 in Application Serial No. 2004279171, 36 pp.

Russian Patent & Trademark Office, Decision on Grant mailed Apr. 22, 2009 in Application Serial No. 2005115870 (translated), 18 pp.

Russian Patent & Trademark Office, Official Action mailed Nov. 9, 2008 in Application Serial No. 2005115870 (translated), 7 pp.

Case for Revocation of Appeal Decision Hei 19 (Gyo Ke) No. 10239 (http://www.courts.go.jp/hanrei/pdf/20080306163050.pdf) (Feb. 29, 2008), 38 pages.

Non-Final Office Action dated Aug. 13, 2010 in U.S. Appl. No. 10/692,530, 6 pages.

Notice of Rejection, Japanese Patent Application No. 2006-536584 (Jul. 30, 2010), 6 pages.

* cited by examiner

METHOD AND SYSTEM FOR IDENTITY RECOGNITION

CROSS REFERENCE TO RELATED APPLICATION

The present application is related to U.S. patent application Ser. No. 10/692,530, entitled METHOD AND SYSTEM FOR IDENTITY EXCHANGE AND RECOGNITION FOR GROUPS AND GROUP MEMBERS, filed concurrently herewith and assigned to the Assignee of the present invention.

TECHNICAL FIELD

The invention relates generally to the field of computer and network security. More particularly, the invention relates to exchanging user-controlled identity information between disparate computer systems.

BACKGROUND OF THE INVENTION

It is often desired to share a computer's resources with users across a network that do not have any representation on the computer from which resources are to be shared. For example, a corporation, university, or other organization may have one or more servers connected to some type of network for use by employees, students, or other individuals. Various entities, including individuals, share information or resources across the Internet or other networks. Wired and wireless networks are becoming more popular for use in homes and a wide range of devices, from personal computers to household appliances are or will be connected to and accessible through these networks. As easier access to a wider variety of resources becomes available, the secure sharing of and collaboration between these resources becomes more important.

One obstacle to the secure sharing of and collaboration between these resources relates to recognizing and authenticating various entities that attempt to access the resources provided. In other words, care must be taken to ascertain and ensure that an entity attempting to access a resource on a computer is the entity it claims to be and has the authorization needed to access those resources. Various methods of recognizing an entity and granting authorization have been used.

One method of recognizing and granting authorization to an entity involves a system of accounts and passwords set up to define a security domain. For example, a corporation may wish to generate a security domain for a server or network where the security domain consists of every full-time employee of the corporation. Those running the security domain, such as system administrators, give each employee an account, typically including a user name and password, and set up policies controlling access to the resources through these accounts. Once a security domain is in place, domain members can be given access to the resources while those without accounts are excluded.

However, a security domain based on a system of accounts requiring users to remember various user names and passwords can be cumbersome. Further, a security domain based on a system of accounts is not a good model for individuals wishing to share information or resources across a network such as the Internet. Additionally, for various business reasons, there may be a need to extend or even replace the traditional closed security domain with individuals chosen from across the Internet. For example, there may be a need to set up a project where employees, outside contractors, and other individuals or entities can be part of a virtual team, accessing shared documents, communications, and other resources.

While it is relatively easy to assume that anyone using an account with a valid username and password for accessing resources is the owner of that account, it has been very difficult to recognize identities which are not a part of a traditional closed security domain. Public key infrastructures have been used as a way to identify and authenticate entities. Public key infrastructures are based on trust relationships between certifying or recommending authorities and the users of these systems. However, these infrastructures are complex to understand, bootstrap, and manage. Therefore, public key infrastructures have not become a mainstream technology for recognizing computer users since they do not provide a simple, easy to use identity recognition system applicable to various types of entities. It is with respect to these considerations and others that the present invention has been made.

SUMMARY OF THE INVENTION

The above and other problems are solved by a system and method for identity recognition of a sender by a recipient and for exchange of identity information utilizing identity information signed by the sender. Selected identity information regarding a principal is included in an identity information document that can be exchanged between computer systems and used for recognition of the principal. Identity recognition does not include authorization. In the invention authentication of a sender, i.e. identity recognition, and authorization of a sender to access a resource of recipient are separated.

In accordance with still other aspects, the present invention relates to a method of sending an identity information document comprising selecting identity information from a self-identity information store for inclusion in the identity information document. The selected identity information is read from a self-identity information store and the identity information document is generated to include the selected identity information and at least a first key such as a public key. The identity information document has a digital signature signed by the sender using a second key, such as a private key, associated with the first key included in the identity information document. The identity information document is then sent to a recipient.

According to another aspect of the present invention, a method of receiving an identity information document comprises receiving a signed identity information document from an originator or sender. A determination is made as to whether identity information conveyed in the identity information document is reliable. The identity information is saved into a recognized identity information store if the identity information is determined to be reliable. The recognized identity information store is used for future recognition, and authentication, of the originator when the originator attempts to again connect to the recipient computer system.

In accordance with yet other aspects, the present invention relates to a system for sending an identity information document. The system comprises a processor, a communication channel connected with the processor, and a memory coupled with and readable by the processor. The memory contains a series of instructions that, when executed by the processor, cause the processor to select identity information from a self-identity information store for inclusion in the identity information document. The selected identity information is read from a self-identity information store, and the identity information document is generated to include the selected identity information and at least a first key. The identity information document has a digital signature signed using a second key that pairs with the first key included in the identity information document. The identity information document is then sent to a recipient connected to the communication channel.

In accordance with still other aspects, the present invention relates to a system for receiving an identity information document. The system comprises a processor, a communication channel connected with the processor, and a memory coupled with and readable by the processor. The memory containing a series of instructions that, when executed by the processor, cause the processor to receive a signed identity information document from an originator or sender. A determination is made as to whether identity information conveyed in the identity information document is reliable. The identity information is saved in a recognized identity information store if the identity information is determined to be reliable. The recognized identity information store is used for future recognition, and authentication, of the originator when the originator attempts to connect to the recipient computer system.

The invention may be implemented as a computer process, a computing system or as an article of manufacture such as a computer program product or computer readable media. The computer readable media may be a computer storage media readable by a computer system and encoding a computer program of instructions for executing a computer process. The computer readable media may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

Before describing various embodiments of the present invention, some terms that will be used throughout this description will be defined.

"Identity information" is a collection of information about a principal in an identity information system through which the principal or its agent is capable of controlling what information is conveyed to a receiving device, and of indicating the intended uses of this information.

An "identity information document" is a subset of identity information for a principal transmitted from one device to another so as to allow the receiving device to represent the originator of the identity information document and subsequently recognize digital events the originator has initiated or responded to.

A "principal" is any entity capable of acting digitally. Principals include individual people, groups or sets of people meaning individuals, households, organizations, explicit groups, and people in common roles, or who share attributes of some kind as well as various electronic devices through which these individuals act.

Figure 1:
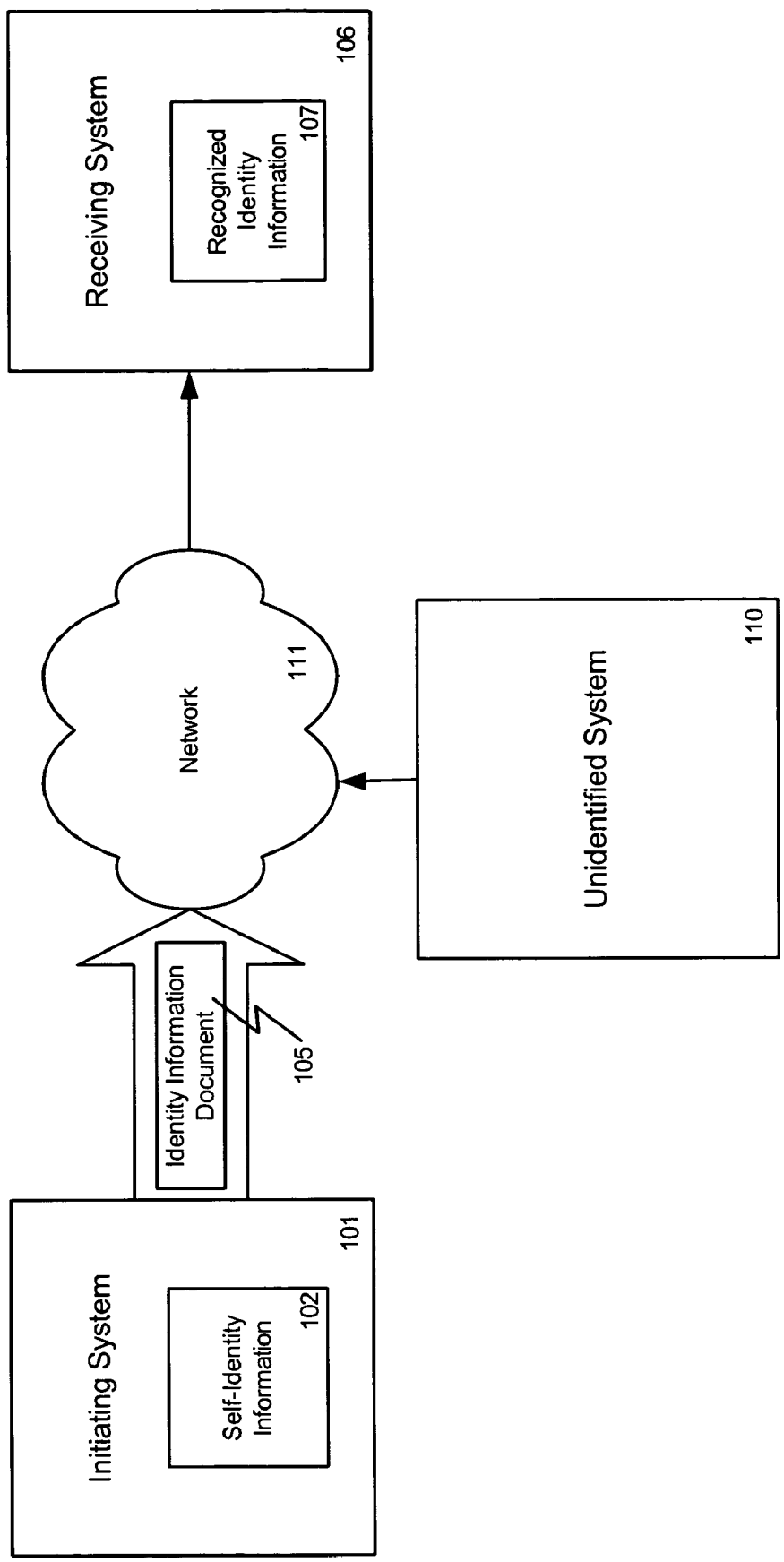
FIG. 1 illustrates at a conceptual level a system for identity recognition according to one embodiment of the present invention.

FIG. 1 illustrates at a conceptual level a system for identity recognition according to one embodiment of the present invention. This example illustrates an initiating system 101 and a receiving system 106 connected via a network 111 or other channel. As will become apparent, most devices can function as both an initiating system 101 and a receiving system 106 at various times. However, for simplicity, these functions are illustrated separately here. Additionally, network 111 may be any type of network including the Internet or may be some other type of channel suitable for establishing communication between the initiating system 101 and the receiving system 106.

The initiating system 101 maintains a set of self-identity information 102. The self-identity information 102 may include a variety of information about the principal represented by or using the initiating system 101. This information, for example, may include a name, email address, website URL, and other personal information as well as a usage policy describing how this information may be used. These different, identifying elements are referred to herein as identity claims.

An identity information document 105 containing some or all of the self-identity information 102 is created. In one embodiment, the identity information document 105 is created in response to a request from the receiving system 106. Therefore, when a principal represented by or using the initiating system 101 wants to send identity information to another system such as the receiving system 106 the user selects the information to send from self-identity information 102. In other words, the principal has the ability to control disclosure of information from the self-identity information 102 when producing an identity information document 105. Therefore, the principal may selectively disclose different subsets of identity data to different recipients, and express their intent as to how the disclosed information may be used. Further, this allows "progressive disclosure", where a principal could send a first identity information document containing little information, divulging more information at some later point when there is reason to do so.

In one particular embodiment, the full identity information document is signed with the a digital signature using the private key of the principal originating the identity information document when the identity information document is generated. Therefore, the identity information document is referred to as being self-signed. In another embodiment, the full identity information document has a digital signature signed with the private key of the organization that has issued the identity claims for the principal originating the identity information document when the identity information document is generated. In this case, the identity information document is referred to as being signed by the organization. Similarly, updates to an already shared identity information document or progressive disclosures will be signed using the private key that was used to sign the originally shared identity information. Public keys paired with the signing private key may be distributed in a variety of manners including as part of an identity information document. Alternatively, key arrangements other than the public/private key system may be used. For example, sets of private keys may be used.

The initiating system 101 produces from the self-identity information 102, the signed identity information document 105 and sends it to the receiving system via network 111. According to one embodiment, the identity information may comprise an eXtensible Mark-up Language (XML) file or a text file that can be sent using any channel to the receiving system 106. Details of one possible format for the identity information document 105 will be discussed below with reference to FIG. 6. However, generally speaking, the identity information 105 may be in a format suitable for transferring information between disparate systems across various types of channels. As mentioned above, the channel used to transfer the identity information document 105 from the initiating system 101 to the receiving system 106 can be any of a variety of possible media. For example, email, instant messaging, beaming, private line and many other mechanisms may be used as channels. Further, the channel may or may not be secure.

The receiving system 106 reads the incoming identity information document 105 and accepts it or rejects it. In a typical scenario, the identity information document 105 originates from a known principal, and the receiving system 106 will be a very good judge of the authenticity of the identity information document 105. However, if an identity information document 105 arrives from an unknown principal, or if there is a fear that impostors have sufficient motivation to open and modify or forge the identity information document 105, the receiving system 106 may reject the identity information document 105 or seek further verification of its authenticity. Details of this verification will be discussed below with reference to FIGS. 3-6.

Once the identity information document is accepted, the information it contains is added to the recognized identity information 107 of the receiving system 106. Once an identity information document 105 has been added to the list of recognized identity information 107, the receiving system 106 can then use the information it contains to authenticate the initiating system 101 in the future and employ channels of interacting with that principal that may not otherwise be trusted. The principal represented by the identity information document 105 may then, for example, be given access to resources on the receiving system 106 such as a calendar or a document. Alternatively, the principal might be challenged and if the challenge is satisfied, then authorized for access to resources on the receiving system. Conversely, an unidentified principal represented by or using an unidentified system 110 that has not provided an identity information document that has been accepted by the receiving system 106 may be excluded from the resources of the receiving system 106. Likewise, an identified principal represented by or using an identified system 110 that has provided an identity information document that has been accepted by the receiving system 106 may be purposely excluded from the resources of the receiving system 106.

Recognition of a principal through the use of an identity information document 105 and importing identity information into the recognized identity information list 107 does not automatically provide that principal any entitlements on or access to the receiving system 106. It only provides a capability of the receiving system 106 to recognize and authenticate the principal in the future. Recognition or authentication does provide a possibility for authorization of file shares, sending of encrypted mail, automatic updates to previously shared identity information, etc. Anyone may be recognized. Recognition implies only that the receiving system 106 knows who it is dealing with, not that any access rights are given to the principal. Recognizing a principal does not imply giving them access to anything. They can be given access after authorization or when it is useful or safe to do so.

Identity recognition thus works in one direction. Therefore it is necessary to require a two-way exchange of identity information between an initiating system 101 and a receiving system 106 in order for identity recognition to work effectively in either direction. A one-way exchange of an identity information document 105 from the initiating system 101 to the receiving system 106 is sufficient for the receiving system 106 to identify the principal represented by or using the initiating system 101 and deal with that principal as appropriate.

Allowing access to the resources of the receiving system 106 based on the identity information document 105 and recognized identity list 107 does not compromise security if the identity of a principal can be recognized and access can be granted or denied as appropriate or if additional authorization processes can be required. Further, any unrecognized principal can be excluded.

Figure 2:
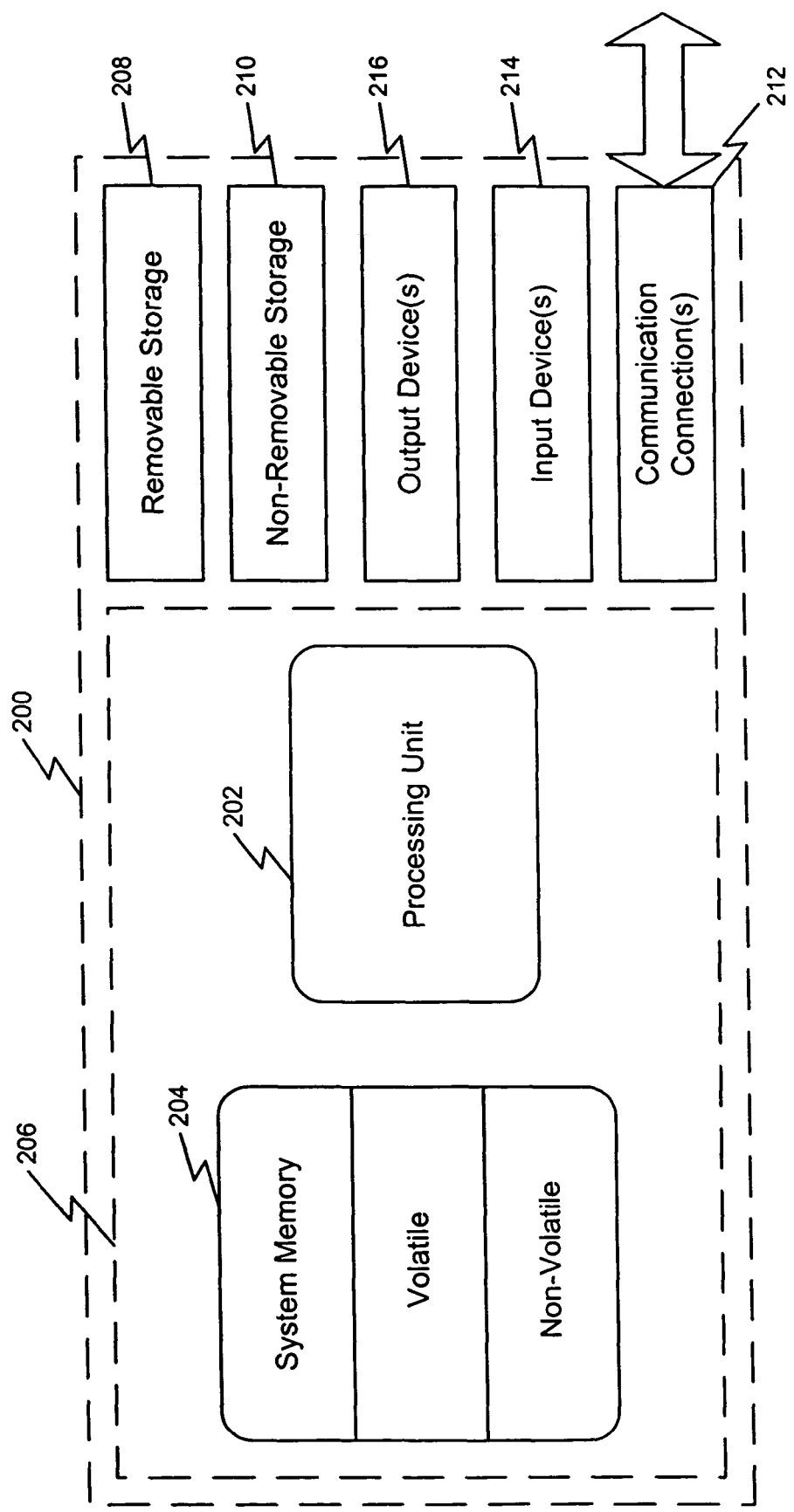
FIG. 2 illustrates an example of a suitable computing system environment on which embodiments of the invention may be implemented.

FIG. 2 illustrates an example of a suitable computing system environment on which embodiments of the invention may be implemented. This system 200 is representative of one that may be used to serve as an initiating system and/or a receiving system as described above. In its most basic configuration, system 200 typically includes at least one processing unit 202 and memory 204. Depending on the exact configuration and type of computing device, memory 204 may be volatile (such as RAM), non-volatile (such as ROM, flash memory, etc.) or some combination of the two. This most basic configuration is illustrated in FIG. 2 by dashed line 206. Additionally, system 200 may also have additional features/ functionality. For example, device 200 may also include additional storage (removable and/or non-removable) including, but not limited to, magnetic or optical disks or tape. Such additional storage is illustrated in FIG. 2 by removable storage 208 and non-removable storage 210. Computer storage media includes volatile and nonvolatile, removable and non-removable media implemented in any method or technology for storage of information such as computer readable instructions, data structures, program modules or other data. Memory 204, removable storage 208 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by system 200. Any such computer storage media may be part of system 200.

System 200 may also contain communications connection (s) 212 that allow the system to communicate with other devices. Communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

System 200 may also have input device(s) 214 such as keyboard, mouse, pen, voice input device, touch input device, etc. Output device(s) 216 such as a display, speakers, printer, etc. may also be included. All these devices are well know in the art and need not be discussed at length here.

A computing device, such as system 200, typically includes at least some form of computer-readable media. Computer readable media can be any available media that can be accessed by the system 200. By way of example, and not limitation, computer-readable media might comprise computer storage media and communication media.

Figure 3:
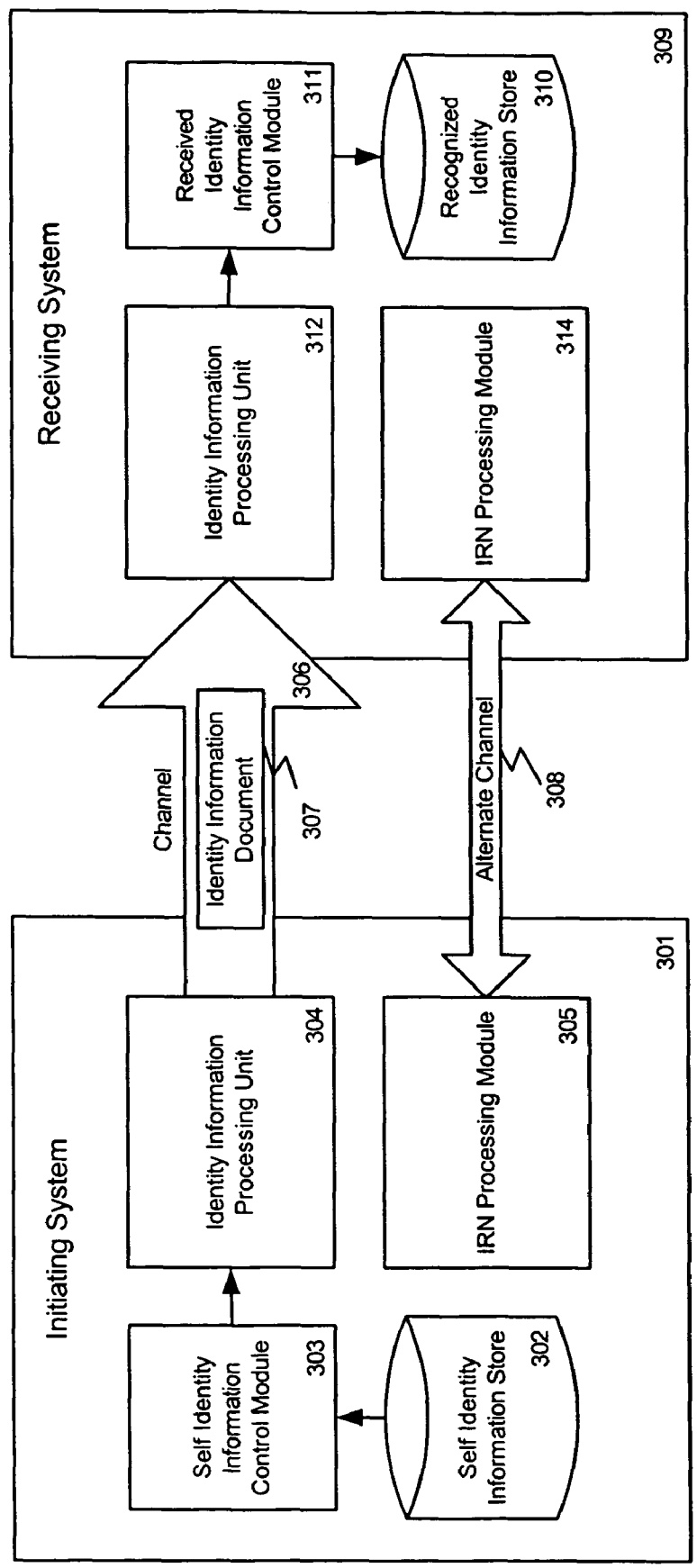
FIG. 3 illustrates exemplary software components of a system for identity recognition according to one embodiment of the present invention.

FIG. 3 illustrates the main software components of a system for identity recognition according to one embodiment of the present invention. This example, similar to that illustrated in FIG. 1, illustrates an initiating system 301 and a receiving system 309 connected via a channel 306. Also, as mentioned above, systems may function as both an initiating system 301 and a receiving system 309 at various times. However, for simplicity, these functions are illustrated separately here.

The initiating system 301 includes a self-identity information store 302, a self-identity information control module 303, an identity information processing unit 304, and an Identity Recognition Number (IRN) processing module 305. The self-identity information store 302 can store information that comprises a database, list, or other collection of information specific to the principal represented by or using the initiating system 301. The self-identity information store 302 can store information such as the principal's name, email address, public keys and/or certificates, and other individualized information that can be used in an identity information document as will be described below.

The self-identity information control module 303 reads identity information from the self-identity information store 302. When a principal wants to send identity information to another system he selects the information to send from the self-identity information store 302 through the self-identity information control module 303. For example, when a principal wants to send an identity information document, a graphical user interface (GUI) may be presented by the self-identity information control module 303 through which the principal selects the information to send from their self-identity information store 302.

The self-identity information control module 303 provides the principal with the ability to control disclosure of information from the self-identity information store 302 when producing an identity information document 307. If presented through a GUI, self-identity information may be presented in a variety of easy to read and easy to use formats. For example, a list of information may be presented for the user to checkmark, or otherwise select, to indicate inclusion in the identity information document. The self-identity information control module 303 therefore allows principals to selectively disclose different subsets of identity information to different receiving systems 309 and express their intent as to how the disclosed information may be used. Further, the self-identity information control module 303 allows "progressive disclosure", where a principal could send a first identity information containing little information, divulging more information at some later point when there is reason to do so.

The identity information processing unit 304 produces, from the information provided by the self-identity information control module 303, an identity information document 307 and sends it to the receiving system 309 via channel 306. According to one embodiment, the identity information document 307 may comprise an XML file or a text file that can be sent using any channel to the receiving system 309. Details of one possible format for the identity information will be discussed below with reference to FIG. 6. However, generally speaking, the identity information 307 should be in a format suitable for transferring information between disparate systems.

The channel 306 used to transfer the identity information document 307 from the initiating system 301 to the receiving system 309 can be any of a variety of possible media. For example, email, instant messaging, beaming, private line and many other mechanisms may be used as channel 306. The channel 306 may or may not be secure.

The receiving system 309 comprises an identity information processing unit 312, a received identity information control module 311, a recognized identity information store 310, and an IRN processing module 314. The identity information processing unit 312 of the receiving system 309 receives the incoming identity information 307 from the channel 306. The identity information processing unit 312 passes the identity information from the identity information document 307 to the received identity information control module 311.

The received identity information control module 311 determines whether to accept or reject the identity information document 307. In some cases, this determination may be based on querying a user through a GUI as to whether to accept or reject the received information. If presented through a GUI, the identity information from the identity information document may be presented in a variety of easy to read formats. For example, the identity information may be presented in the form of a rolodex or "contacts" entries allowing for quick and easy review of the information.

If the identity information document 307 originated from a known principal, the receiving system 309 will be a very good judge of the authenticity of the identity information document 307. However, if identity information originated from an unknown principal, or if there is a fear that impostors have sufficient motivation to open and modify mail, the receiving system 309 uses the Identity Recognition Number (IRN) processing module 314 to verify the identity information document 307.

Identity information documents 307 can be exchanged over a variety of media. Some media are more susceptible to spoofing than others. When identity information documents 307 are exchanged over more susceptible media like email or when the identification information document 307 is otherwise questionable, it may be beneficial to perform out-of-band verification of the integrity of the identity information document 307 to ensure that it has not been subject to spoofing or man-in-the middle attacks. The degree to which out-of-band verification will be required varies based upon how the identity information is acquired and the sensitivity of the information intended to be shared with the sending party.

To support out-of-band verification of the binding of identification information document 307 to a principal, an Identity Recognition Number (IRN) may be used. The IRN is a hash of the principal's public key with a suitable transformation function to render it as a readable string that is included in the identification information document. The IRN, through this transformation function, may be indicated by an easily readable and memorable series of numbers. For example, the IRN may be similar to a phone number.

To perform out-of-band verification, the IRN processing module 314 of the receiving system 309 computes and displays the IRN for the identity information document 307. The receiving system or user thereof then contacts the originator by an alternate channel 308 such as calling the originator on the phone or through Instant Messaging (IM) and asks the originator to confirm his IRN. The IRN processing module 314 may then verify that the confirmed IRN matches what is computed at the recipient end based on the received identity information document 307.

If a man-in-the-middle attack had tampered with the identity information document 307 received by the receiving system 309 by substituting the public key information to spoof the sender, then the computed IRN would not match the true sender's IRN which would become evident in the out-of-band verification process. Note that the IRN can be public information as it is computed from the public key and, hence, is suitable for inclusion in such things as business cards as an attestation to a person's identity.

Once the identity information document 307 is accepted, the information it contains is added to the recognized identity information store 107. The principal originating the identification information document 307 can then be given access to resources on the receiving system 309. In the future, if the principal tries to access that resource, his or her computer will be challenged to demonstrate knowledge of the private key associated with the public key in the identity information document 307. If the principal is authentic, the computer can provide this proof of knowledge, resulting in recognition and admission to the resource.

Alternatively, even rejected identity information may be placed into the recognized identity information store 107. For example, even though a given set of identity information is rejected, it might be stored for future reference and marked as being unreliable. This recognized but unreliable identity information may be marked as such by being stored in a special portion of the recognized identity information store or by being tagged or flagged in some manner. Such information may be useful in future identification of unreliable identity information.

Additionally, identity information in the recognized identity information store 107 may be made accessible, perhaps through a GUI, for review by a user of the receiving system. If presented through a GUI, the identity information from the recognized identity information store 107 may be presented in a variety of easy to read formats. For example, the identity information may be presented in the form of a rolodex or "contacts" entries allowing for quick and easy review of the information.

Using the system illustrated in FIG. 3, exchanging identity information documents that contain confidential information about its subject can be securely accomplished by utilizing a process of progressive disclosure of identity information. In this process, the originator and the recipient first exchange public keys which may be encapsulated in certificates such as X509v3 certificates, for example, and the minimal necessary identity claims through identity information documents. The parties then exchange the full set of remaining disclosed attributes encrypted with the public key of the recipient of the information. This ensures that the confidential data can only be seen by the intended recipient and nobody else. Of course, it is not mandatory that an exchange of identity information documents be required in order to use the progressive disclosure method. Progressive disclosure can be used for a one-way sharing as well. The progressive disclosure exchanges can occur asynchronously in a stateless fashion, and are not required to be wrapped by a session nor bound to a specific protocol.

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 4:
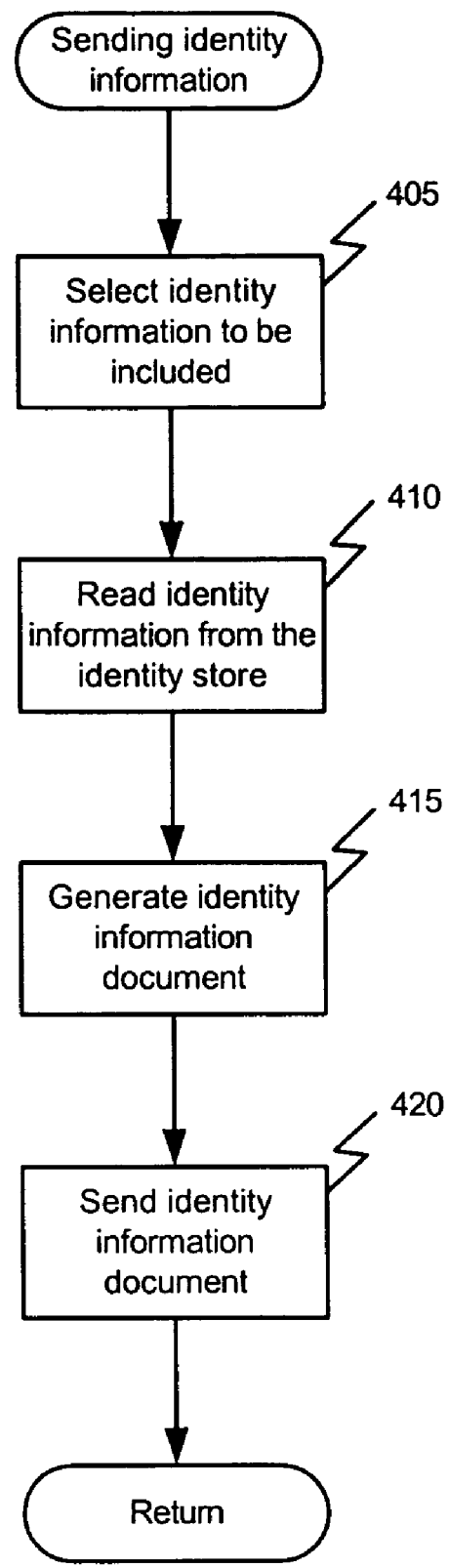
FIG. 4 is a flowchart illustrating initiating an exchange of identity information according to one embodiment of the present invention.

FIG. 4 is a flowchart illustrating initiating an exchange of identity information according to one embodiment of the present invention. Here processing begins with select operation 405. Select operation 405 comprises selecting identity information from the self-identity information store to be included in the identity information document. Select operation selects identity information for inclusion in the identity information document based on user input through a GUI or automatically where pre-selected sets of identity information have been identified for certain situations. Control then passes to read operation 410.

Read operation 410 comprises reading the selected identity information from the self-identity information store. The read operation locates the selected identity information and retrieves the information from the self-identity information store. Control then passes to generate operation 415.

Generate operation 415 comprises generating the identity information document including the information selected and read from the self-identity information store. The generate operation 415 builds the identity information document from the selected information. As will be described below, the identity information document may comprise an XML file. Alternatively, the identity information document may be in any form suitable for transferring information to disparate systems across various media. Additionally, the identity information document includes at least a first key such as one or more public keys, possibly encapsulated in certificates. The identity information document may be signed with a digital signature using a second key such as private key paired with one of the public keys included in the identity information document. Control then passes to send operation 420.

Send operation 420 comprises sending the identity information document to the receiving system via a channel. The send operation transmits, communicates or sends the identity information document in an outgoing signal to the receiving system. As discussed above, the channel may or may not be secure. Examples of channels over which the identity information document may be sent include, but are not limited to, email, instant messaging, beaming, private line etc.

Figure 5:
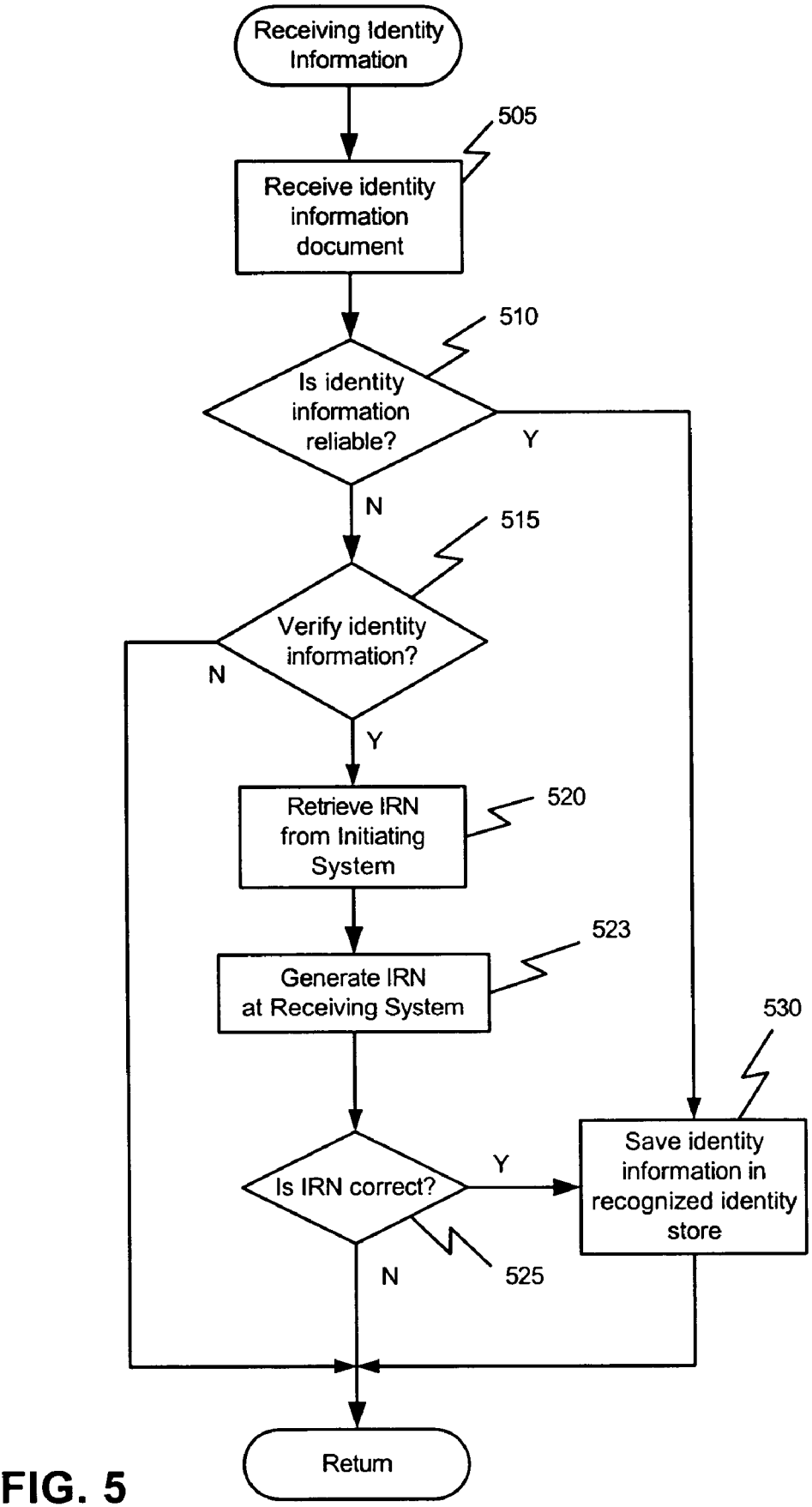
FIG. 5 is a flowchart illustrating receiving identity information according to one embodiment of the present invention.

FIG. 5 is a flowchart illustrating receiving identity information according to one embodiment of the present invention. In this example processing begins with receive operation 505. Receive operation 505 comprises receiving an identity information document from a channel such as described above. The receive operation processes the incoming signal from the initiating system to recover the identity information document from the incoming signal. Control then passes to query operation 510.

Query operation 510 comprises determining whether the identity information received in the identity information document is reliable. The query operation tests the authenticity of the identity information based on a number of circumstances related to how the information was received. In some cases the determination of authenticity may simply rely on querying a user through a GUI as to whether to accept or reject the information. In other cases an algorithm of heuristics may be used to make the determination automatically based on the media used to transfer the information, the sensitivity of the information, and any number of other criteria. If the information is determined to be reliable, control passes to save operation 530 where the identity information received in the identity information document is saved in the recognized identity information store. After the save operation writes the identity information into the recognized identity information store, operation flow returns to the main program flow.

If, at query operation 510, the identity information is not determined to be reliable, control passes to query operation 515. Verify query operation 515 comprises determining whether to attempt to verify the identity information document. Verify query operation is deciding whether or not to perform a verification process. This determination may be made automatically by default, may be based on user input through a GUI, or may be based on a number of other criteria programmable by the user. If, at query operation 515 a determination is made to not verify the identity information, no further processing is performed and the operation flow returns to the main program flow. If, however, a determination is made to attempt to verify the identity information, control passes to retrieve operation 520.

IRN Retrieve operation 520 comprises retrieving the IRN from the initiating system or originator. The retrieve operation commands the receiving system or prompts the user of the receiving system to contact the initiating system or originator by an alternate channel. For example the user might call the originator on the phone or send a message through IM (instant messaging) and ask the originator to confirm his IRN.

IRN generate operation 523 recreates the IRN at the receiving station based on the public key received in the identity information document. In order to compute the IRN at the IRN generate operation 523 hashes the public key transmitted in the identity information document. Alternatively, the display name (FIG. 6) of the originator may combined with the public key and the combination is then hashed. The result of the hashing operation may then be subjected to a masking algorithm to produce an alphanumeric signature of the form AAA-AA-AA-AAA where 'A' indicates an alphanumeric characters. The IRN computed by IRN generate operation 523 might look like 732-AB-5H-XVQ. Then the two IRNs are compared by the IRN test operation 525.

IRN test operation 525 comprises determining whether the IRN is correct. IRN test operation 525 compares the computed IRN, generated at the receiving station, to the retrieved IRN retrieved from the initiating system. If a man-in-the-middle attack has tampered with the identity information received by the recipient by substituting the public key information to spoof the sender, then the computed IRN would not match the retrieved IRN from the originator or initiating system, i.e. the true sender.

If the IRN is determined to be correct, control passes to save operation 530. Save operation 530 saves or stores the identity information received in the identity information document in the recognized identity information store. The operation flow then returns to the main control program in the receiving system.

Alternatively, even rejected identity information may be placed into the recognized identity information store. For example, even though a given set of identity information is rejected, it might be stored for future reference and marked as being unreliable. This recognized but unreliable identity information may be marked as such by being stored in a special portion of the recognized identity information store or by being tagged or flagged in some manner. Such information may be useful in future identification of unreliable identity information.

Figure 6:
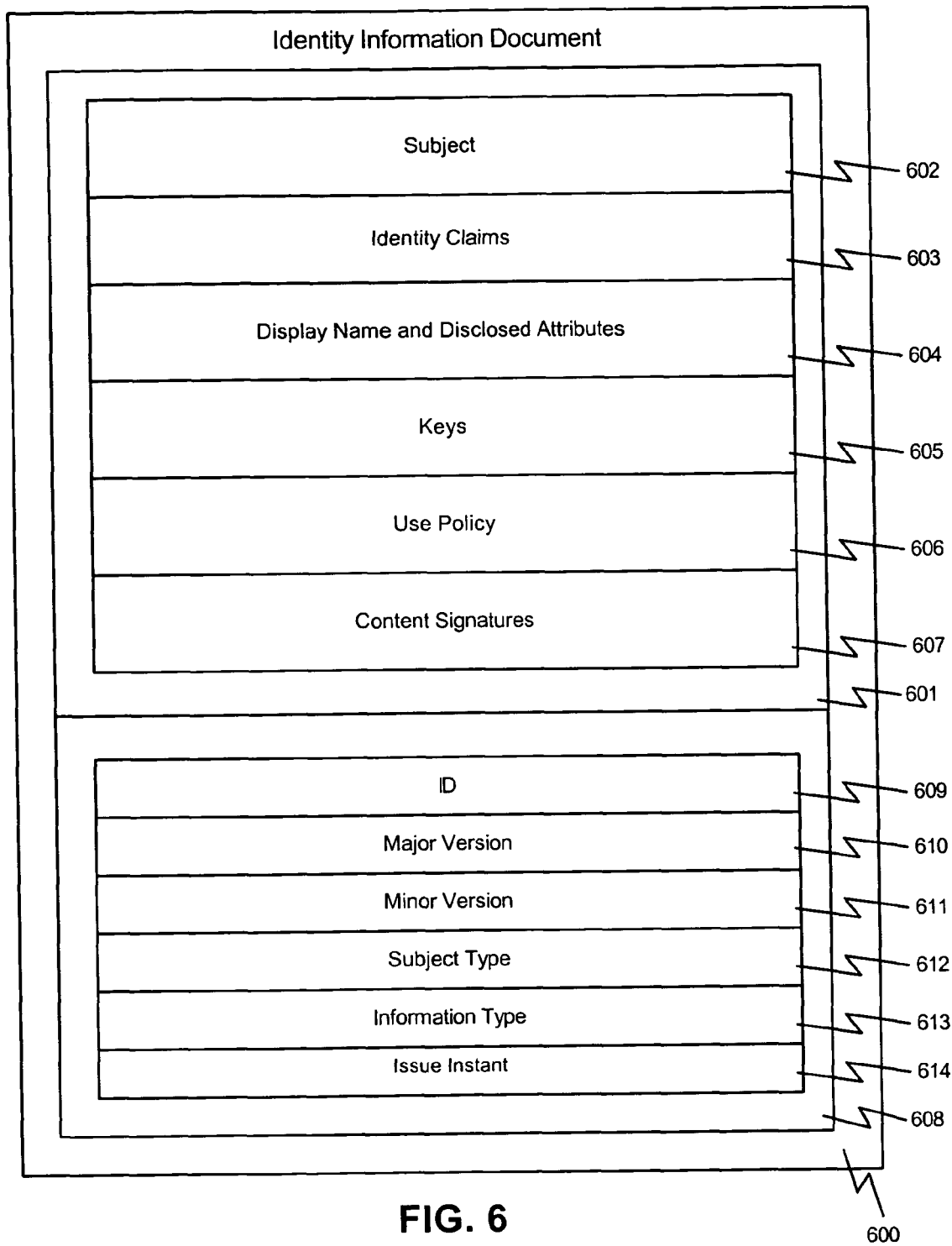
FIG. 6 illustrates an exemplary format for an identity information document according to one embodiment of the present invention.

FIG. 6 illustrates an exemplary format for identity information document according to one embodiment of the present invention. As a data structure, the identity information document 600 is a collection of identity claims and other attribute/property claims bound to a key and governed by an embedded use policy. XML will be used as the encoding language for the identity information. However, other formats are considered equally suitable. The elements of the identity information document 600 may also be optionally encrypted if it contains confidential information whose confidentiality must be maintained.

The data within the identity information document 600 can be divided into two categories. These categories include a set of logical components 601 and a set of attributes tags 608. The identity information document has six principal logical components: 1) an identity information subject identifier 602; 2) one or more identity claims of the subject 603; 3) a display name and zero or more selectively disclosed attributes of the subject 604; 4) one or more keys for the subject enveloped in any acceptable formats (for example, public keys in X509v3 certificates) 605; 5) a use policy that expresses the subject's privacy requirements 606; and 6) a digital signature over the entire content of the identity information that protects the integrity of the data and authenticates the sender in the case of identity information updates 607. Each of these six logical components 601 will be discussed in turn.

The subject identifier 602 represents the subject of the identity information as an entity that is identified by one of its identity claims expressed as a name identifier. The preferred name identifier or identity claim for the identity information subject is the email address if the subject type is a person.

Identity claims 603 include structured information that uniquely identifies the subject of the identity information document. An identity claim is a value assigned by an authority of a given type to identify a single principal during a given period of time. The identity claims in an identity information document identify the principal in various namespaces, and the display name and other disclosed information such as a physical mailing address supply further context for the principal once it has been identified.

The display name 604 can be used on the recipient's system during searches and operations. However, it need not be unique. Display name and other disclosed information (such as a physical mailing address) supply additional context for a principal once it has been identified via the identity information's Subject specification. Disclosed Information consists of descriptive information about the subject. This is expressed as a set of properties. Some properties may be standardized, and there may be an extension mechanism.

The keys 605 contains one or more keys, possibly encapsulated within a certificate format (for example, X509v3 certificates). The keys 605 can be public keys and can be included in the identity information as recognition information for the subject of the identity information. If a certificate is used, it may be self-signed or issued by a certificate authority.

The use policy 606 conveys the originator's instructions to the recipient about the uses to which the contents of the identity information may be put. For example, it may indicate that the contents of the identity information should not be divulged to others. The recognized identity information store will store the use policy along with the rest of the information defining the principal, and if a user attempts, for example, to copy a principal which is not intended to be shared, the system will display a warning to the user indicating the originator's intentions.

The digital signature 607 provides signing data within the identity information document. XML signatures have three ways of relating a signature to a document: enveloping, enveloped, and detached. According to one embodiment of the present invention, the identity information document use XML enveloped signatures when signing the identity information content.

The identity information document 600 can carry six attributes tags 608 including: 1) an identity information ID 609; 2) a major version 610; 3) a minor version 611; 4) a subject type 612; 5) an information type 613; and 6) an issue instant 614. Each of these attribute tags 608 will be discussed below.

The identity information ID 609 is an identifier for this identity information document. It provides an identifier with which the identity information document can be referenced from other parts of the document such as the signature.

The major version 610 is the major version number of this identity information document. The minor version 611 is the minor version number of this identity information document.

The subject type 612 is the type of principal that is the subject of this identity information document. There can be various types of principals such as person, computer, organization etc.

The information type 613 is the type of this identity information. For example, a "New" identity information can be imported into the recognized identity information store to create a new principal, or an "Update" identity information can be used to improve an existing principal with more recent changes.

The issue instant attribute 614 is the time instant, expressed in UTC, when the identity information was issued or generated. This time stamp on an update identity information can be used to determine if the existing representation of the identity information's subject is out-of-date or newer.

Although the invention has been described in language specific to computer structural features, methodological acts and by computer readable media, it is to be understood that the invention defined in the appended claims is not necessarily limited to the specific structures, acts or media described. As an example, different formats other than XML may be used to encode identification information. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A computer-implemented method of sending an identity information document from an initiating system to an intended receiving system, the method comprising:
    presenting a list of identity information from a self-identity information store included in the initiating system for a principal using the initiating system to select information to include in a first identity information document and to include in a second identity information document, wherein the first identity information document is based on a first intended receiving system and the second identity information document is based on a second intended receiving system, the first intended receiving system being different from the second intended receiving system, and wherein the presenting the list of identity information for selection allows the principal to control the disclosure of identity information to the first and the second intended receiving systems;
    receiving a first selection of identity information from the list of identity information from the self-identity information store stored in a memory for inclusion in the first identity information document, wherein the first selected identity information comprises a first subset of identity information relating to the principal in the self-identity information store, and wherein the first subset of identity information is specific to the first intended receiving system;
    receiving a second selection of identity information from the list of identity information from the self-identity information store stored in memory for inclusion in the second identity information document, wherein the second selected identity information comprises a second subset of identity information relating to the principal in the self-identity information store, and wherein the second subset of identity information is specific to the second intended receiving system and is different from the first subset of identity information;
    reading the first and the second selected identity information from the self-identity information store included in the initiating system;
    generating the first identity information document to include the first selected identity information and at least a first key, the first identity information document signed using a second key associated with the first key in the first identity information document; and
    sending the first identity information document to the first intended receiving system.

2. The method of claim 1, wherein the receiving a first selection of identity information comprises receiving a selection of the first subset of identity information from the self-identity information store based on user input from a Graphical User Interface (GUI).

3. The method of claim 1, wherein the receiving a first selection of identity information comprises receiving a selection of a predetermined subset of information from the self-identity information store.

4. The method of claim 1, wherein generating the first identity information document comprises encoding the first selected identification information in an eXtensible Mark-up Language (XML) document.

5. The method of claim 1, wherein the first selected identity information comprises identity claims of the principal originating the first identity information document.

6. The method of claim 1, wherein the first selected identity information comprises use policies for defining uses to which the contents of the identity information may be put.

7. A computer-implemented method of receiving an identity information document at a recipient from an initiating system, the method comprising:
    receiving, at a first recipient, a signed first identity information document from the initiating system, wherein the first identity information document contains selected identity information comprising a first subset of identity information relating to a principal and selected from a self-identity information store included in the initiating system, and wherein the first subset of identity information is specific to the first recipient, and wherein the first subset of identity information is different from a second subset of identity information, the second subset of identity information being contained in a second identity information document intended for a second recipient;
determining whether the first subset of identity information in the first identity information document is reliable;
saving the first subset of identity information in a recognized identity information store located at the first recipient and stored in a memory if the first subset of identity information is determined to be reliable;
determining whether to verify the first subset of identity information if the first subset of identity information is not reliable; and
if the first subset of identity information is not reliable, saving the first subset of identity information in the recognized identity information store at the first recipient with a flag indicating the first subset of identity information is not reliable.

8. The method of claim 7, further comprising:
responsive to determining to verify the first subset of identity information, retrieving an Identification Recognition Number (IRN) from the initiating system of the first identity information document, determining whether the IRN is correct and, responsive to the IRN being correct, saving the first subset of identity information in the recognized identity information store.

9. The method of claim 7, wherein determining whether the first subset of identity information is reliable is based on a user input through a graphical user interface.

10. The method of claim 7, wherein determining whether to verify the first subset of identity information is based on a user input through a graphical user interface.

11. A system to send an identity information document comprising:
a processor;
a communication channel connected with the processor; and
a memory coupled with and readable by the processor, the memory containing a series of instructions that, when executed by the processor, cause the processor to:
select identity information from a self-identity information store included in an initiating system for inclusion in a first identity information document, wherein the selected identity information comprises a predetermined first subset of identity information relating to a principal in the self-identity information store and wherein the predetermined first subset of identity information is specific to a first intended recipient and is automatically selected for inclusion in the first identity information document, and wherein a predetermined second subset of identity information relating to the principal in the self-identity information store is specific to a second intended recipient, the second subset of identity information being different from the first subset of identity information;
read the first subset of identity information from the self-identity information store included in the initiating system;
generate the first identity information document to include the first subset of identity information and at least a first key, the first identity information document signed using a second key paired with the first key; and
send the first identity information document to the first intended recipient connected to the communication channel to establish an identity of the principal at the first recipient.

12. The system of claim 11, wherein the selecting identity information for inclusion in a first identity information document comprises selecting the first subset of identity information from the self-identity information store based on user input from a Graphical User Interface (GUI).

13. The system of claim 11, wherein the generating the first identity information document comprises encoding the first subset of identification information in an eXtensible Mark-up Language (XML) document.

14. The system of claim 11, wherein the first subset of identity information comprises identity claims of the principal originating the first identity information document.

15. The system of claim 11, wherein the first subset of identity information comprises use policies for defining uses to which the contents of the first subset of identity information may be put.

16. A system to receive an identity information document at a recipient from an initiating system for use in future recognition of a principal comprising:
a processor;
a communication channel connected with the processor; and
a memory coupled with and readable by the processor, the memory containing a series of instructions that, when executed by the processor, cause the processor to:
receive, at a first recipient, a signed first identity information document from the initiating system, the signed first identity information document containing selected identity information comprising a first subset of identity information relating to the principal in a self-identity information store included in the initiating system, wherein the first subset of identity information is specific to the first recipient, and wherein a second subset of identity information relating to the principal in the self-identity information store is specific to a second intended recipient, the second intended recipient being different from the first intended recipient, and the second subset of identity information being different from the first subset of identity information;
determine whether the first subset of identity information in the first identity information document is reliable;
determine whether to verify the first subset of identity information if the identity information is not reliable;
save the first subset of identity information in a recognized identity information store located at the first recipient if the first subset of identity information is determined to be reliable; and
if the first subset of identity information is not reliable, save the first subset of identity information in the recognized identity information store at the first recipient with a flag indicating the first subset of identity information is not reliable, the recognized identity information store being used for future recognition of the principal.

17. The system of claim 16, further comprising:
responsive to determining to verify the first subset of identity information, receiving an Identification Recognition Number (IRN) from the initiator of the first identity information document, determining whether the IRN is correct and, responsive to the IRN being correct, saving the first subset of identity information in the recognized identity information store.

18. The system of claim 17, wherein the determining whether the first subset of identity information is reliable is based on a user input through a graphical user interface.

19. The system of claim 17, wherein the determining whether to verify the first subset of identity information is based on a user input through a graphical user interface.

20. A computer readable storage medium encoding a computer program of instructions for executing a computer process for identity recognition, said computer process comprising:

presenting a list of identity information from a self-identity information store included in an initiating system for a principal using the initiating system to select information to include in a first identity information document and to include in a second identity information document, wherein the first identity information document is based on a first intended recipient and the second identity information document is based on a second intended recipient, the first intended recipient being different from the second intended recipient, and wherein the presenting the list of identity information for selection allows the principal to control the disclosure of identity information to the first and the second intended recipients;

receiving a first selection of identity information from the list of identity information from the self-identity information store stored in a memory for inclusion in the first identity information document, wherein the first selected identity information comprises a first subset of identity information relating to the principal in the self-identity information store, and wherein the first subset of identity information is specific to the first intended recipient;

receiving a second selection of identity information from the list of identity information from the self-identity information store stored in memory for inclusion in the second identity information document, wherein the second selected identity information comprises a second subset of identity information relating to the principal in the self-identity information store, and wherein the second subset of identity information is specific to the second intended receiving system and is different from the first subset of identity information;

reading the first and the second selected identity information from the self-identity information store included in the initiating system;

generating the first identity information document to include the first selected identity information and at least a public key, the first identity information document signed with a private key associated with the public key in the first identity information document; and sending the first identity information document to the first recipient to establish an identity of the principal at the first recipient;

generating the second identity information document to include the second selected identity information and a digital signature; and sending the second identity information document to the second recipient to establish an identity of the principal at the second recipient.

21. The computer readable storage medium of claim 20, wherein the receiving a first selection of identity information comprises receiving a selection of the first subset of identity information from the self-identity information store based on user input from a Graphical User Interface (GUI).

22. The computer readable storage medium of claim 20, wherein generating the first identity information document comprises encoding the first selected identification information in an eXtensible Mark-up Language (XML) document.

23. The computer readable storage medium of claim 20, wherein the first selected identity information comprises identity claims of the principal originating the first identity information document.

24. The computer readable storage medium of claim 20, wherein the first selected identity information comprises use policies for defining uses to which the contents of the identity information may be put.

* * * * *